March 9, 1971  E. WYSS  3,568,283
METAL CUTTING TOOL
Filed Jan. 22, 1969  2 Sheets-Sheet 1
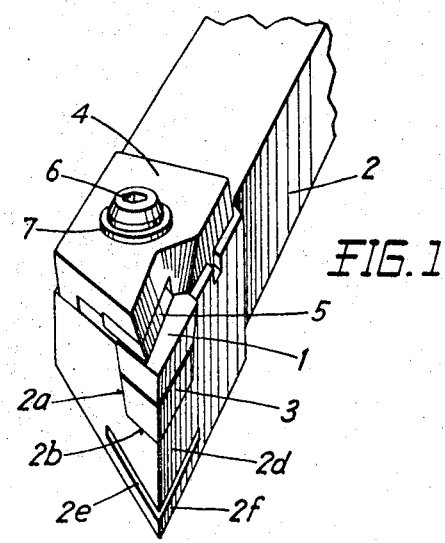
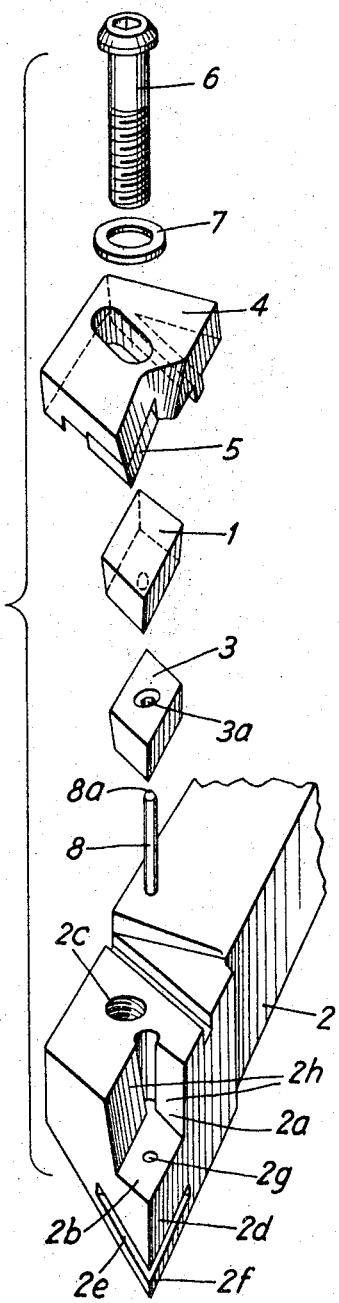
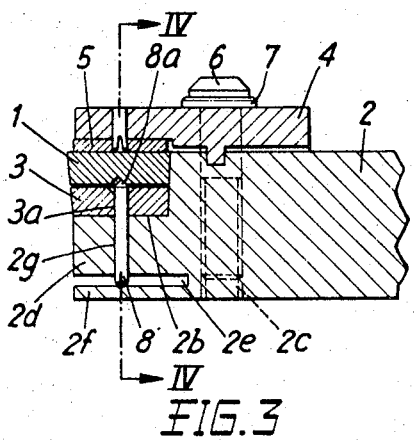
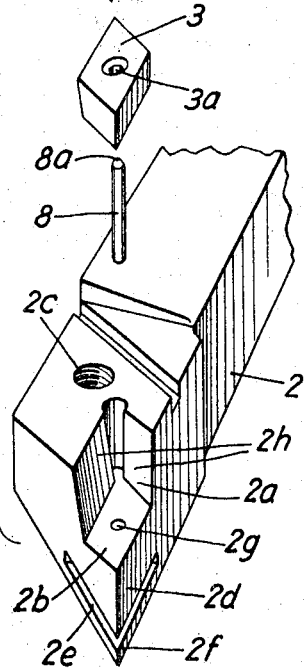
INVENTOR
EDGAR WYSS
By: Jacobi & Davidson
ATTORNEYS.

March 9, 1971 E. WYSS 3,568,283
METAL CUTTING TOOL
Filed Jan. 22, 1969 2 Sheets-Sheet 2

INVENTOR
EDGAR WYSS
BY: Jacobi & Davidson
ATTORNEYS.

United States Patent Office 3,568,283
Patented Mar. 9, 1971

3,568,283
METAL CUTTING TOOL
Edgar Wyss, Morigen, Switzerland, assignor to Vereinigte Drahtwerke A.G., Biel, Bern, Switzerland
Filed Jan. 22, 1969, Ser. No. 793,094
Claims priority, application Switzerland, Feb. 2, 1968, 1,594/68
Int. Cl. B26d 1/00
U.S. Cl. 29—96                              4 Claims

ABSTRACT OF THE DISCLOSURE

A spring tongue, integral with the toolholder, presses the upper end of a pin into and against the wall of a depression in the lower face of the cutting tip, the depression and the pin upper end being so shaped, dimensioned, and positioned that a resultant force exerted on the cutting tip prevents the latter from slipping.

BACKGROUND OF THE INVENTION

The invention relates to a metal cutting tool having a toolholder with a seat, a cutting tip incorporating at least one cutting edge, and a clamp for clamping the cutting tip against or in the toolholder seat.

Machining is done more and more using cutting tools of this kind. Complaints have been publically expressed, as, for example, in the article Drehmeissel mit Wendeschneidplatten ("Turning Tool With Reversible Cutting Tips") appearing in the Swiss weekly, Technische Rundschau, Number 25, for June 11, 1965, that the cutting tip is not sufficiently well clamped to be held tightly at all times. Particularly when copy-turning, the substantial cutting forces are sometimes sufficient to change the location of the cutting tip in the toolholder, and therefore to change the contour and dimensions of the work piece. A number of arrangements have been proposed to prevent the cutting tip from moving.

In one known tool of this kind, the cutting face of the cutting tip is provided with one or more grooves that are engaged by suitably shaped projections of the clamping shoe. Two disadvantages of the construction are that the chip breaker width cannot be adjusted, and that the grooves, embodied in the cutting face, which is subjected to a pulling stress while machining, increase the danger that the cutting tip will break.

In another form, the side rakes of the cutting tip have one or more recesses that are engaged by suitably designed, auxiliary clamping members. Here, it is possible to adjust the chip breaker width; but at least two additional parts are required, and replacement of the cutting tip requires two operations. Moreover, because of these recesses, the cutting tip is more likely to break.

SUMMARY OF THE INVENTION

The purpose of the invention is to produce a cutting tool of the sort described in the first paragraph of the preceding section, and which incorporates means for securing the cutting tip against slippage, while the latter is clamped, and avoids the disadvantages of the cutting tools of this sort of the prior art.

In accordance with the invention, the aforesaid means includes a hole in the toolholder, a pin held in this hole, and a depression for receiving the upper end of the pin embodied in the face of the cutting tip that is located opposite the toolholder seat.

When a supporting plate is located between the toolholder seat and the cutting tip, the pin extends through the supporting plate.

In a particularly advantageous embodiment, the pin upper end is resiliently pressed into the depression, the pin upper end and the depression being conical, or the one conical and the other hemispherical, the arrangement preferably being such that there is exerted on the cutting tip a force which acts to push the cutting tip back. The lower part of the toolholder advantageously has an integral spring tongue which presses against the lower end of the pin and resiliently forces the pin upper end into the depression.

BRIEF DESCRIPTION OF THE DRAWINGS

The invention will be described, with reference to the figures of the drawings, wherein:

FIG. 1 is a perspective view of the cutting tool of the invention;

FIG. 2 is a view similar to FIG. 1, except that it is exploded;

FIG. 3 is a longitudinal section taken along a plane containing the axis of the pin that prevents the cutting tip from slipping;

DESCRIPTION OF THE PREFERRED EMBODIMENT

Figure 4:
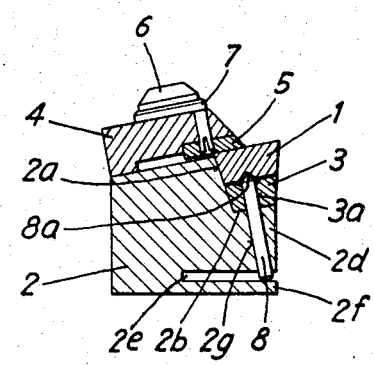
FIG. 4 is a sectional view taken along line IV—IV of FIG. 3.
Figure 5:
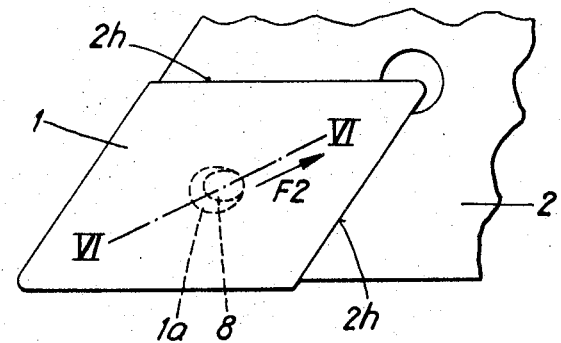
FIG. 5 is a top view on enlarged scale of the cutting tip and the neighbouring part of the toolholder.
Figure 6:
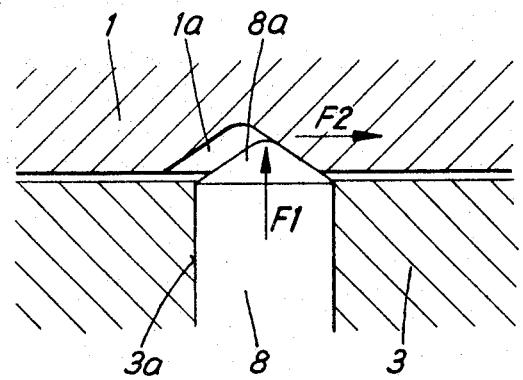
FIG. 6 is a sectional view, on a still greater scale, taken along line VI—VI of FIG. 5.

With reference to the figures, the metal cutting tool illustrated is a turning tool that is especially suitable for copy-turning. The tool incorporates a cutting tip 1, which has quadrilateral sides and is composed of carbide metal or of a ceramic material. The cutting tip rests on a supporting plate 3 that is of the same shape as the cutting tip, and these two parts are set into a suitably shaped milled-out portion 2a embodied in the front part of a toolholder 2. The seat for the supporting plate 3 (or for the cutting tip 1, if a plate 3 is not used) is given the reference 2b. The arrangement is clamped by a clamping shoe 4, a washer 7, and a clamping bolt 6 that is screwed into the threaded hole 2c of the toolholder 2. The clamping shoe, together with its chip breaker 5, can be adjusted as desired by loosening the bolt, in order to change the degree to which the cutting face of the cutting tip is exposed.

This much of the cutting tool is conventional. In accordance with the invention, the cutting tip, when clamped, is secured against slipping by the following arrangement.

The toolholder part 2d below the seat 2b embodies, very near its lower face, a slot 2e that extends at least approximately parallel to the seat and which forms a spring tongue 2f. A cylindrical pin 8, the lower end of which rests on this spring tongue, is held virtually without play in a hole 2g that extends in the toolholder part 2d from the slot 2e to the seat 2b. The supporting plate 3 embodies a hole 3a that is coaxial with the hole 2g and through which the upper part of the pin extends. The pin upper end 8a projects out of the hole 3a and defines a cone with a rounded-off apex. This end enters a slightly larger, but suitably conical depression 1a, which the lower face of the cutting tip embodies. This depression is so dimensioned and positioned that the pin 8, as the bolt 6 is screwed home, is pressed slightly downwards in the holes 2g and 3a against the spring tongue 2f. The resisting force F1 of the spring tongue, which is transmitted by the pin tapered end 8a to the wall of the depression 1a and thus to the cutting tip 1, yields a resultant force F2, which forces the cutting tip backwards and thus presses its two side rakes against the corresponding two walls 2h of the milled-out portion 2a of the toolholder 2. This force F2 is also active, of course, while the cutting tip is clamped, which latter, therefore, is secured against slipping and particularly against being pulled out.

The securing effect of the invention is also present when, as is the case, for example, with large rake angles, the axis of the pin 8, in order to ensure that the pin lower end properly rests on the spring tongue 2f, cannot be arranged at right angles to the cutting face. In accordance with the invention, the securing effect can also be obtained when the pin end 8a has the shape of a hemisphere. Conversely, the depression 1a can be hemispherical and the pin end 8a conical.

It is apparent from the foregoing description that the invention is simple and inexpensive. In tests it has securely held the cutting tip in place under the most difficult conditions, while not increasing the danger of cutting-tip breakage.

Although the preferred embodiment of the invention has been described, the scope of and the breadth of protection afforded to the invention are limited solely by the appended claims.

What is claimed is:

1. A metal cutting tool, including a toolholder, a cutting tip having at least one cutting edge, a seat incorporated by said toolholder, a clamp for clamping said cutting tip against or in said seat, and means for securing said cutting tip against slipping when the latter is clamped and machining is underway, and wherein the improvement comprises that said means includes a hole in said toolholder extending from below said seat to said seat, a pin held in said hole and defining an upper end that projects above said seat, and a depression, for receiving said pin upper end, embodied in the face of said cutting tip that is located opposite said seat, said depression and pin upper end each being conical in shape, said depression and pin upper end being dimensioned and positioned with respect to each other such that the latter presses against the wall of the former and thereby exerts a force on said cutting tip that acts to push back the latter, resilient means for pressing said pin upper end against the wall of said depression, said resilient means comprising a spring tongue that supports the lower end of said pin.

2. The cutting tool as defined in claim 1, wherein said toolholder comprises a face located below said seat, a slot in said toolholder, said slot extending at least approximately parallel to said seat and being located sufficiently near to said toolholder lower face so as to form out of said toolholder, between said slot and lower face, said spring tongue.

3. A metal cutting tool, including a toolholder, a cutting tip having at least one cutting edge, a seat incorporated by said toolholder, a clamp for clamping said cutting tip against or in said seat, and means for securing said cutting tip against slipping when the latter is clamped and machining is underway, and wherein the improvement comprises that said means includes a hole in said toolholder extending from below said seat to said seat, a pin held in said hole and defining an upper end that projects above said seat, and a depression, for receiving said pin upper end, embodied in the face of said cutting tip that is located opposite said seat, a supporting plate that rests on said seat for supporting said cutting tip, said supporting plate incorporating a hole through which the upper part of said pin extends, said depression and pin upper end each being conical in shape, said depression and pin upper end being dimensioned and positioned with respect to each other such that the latter presses against the wall of the former and thereby exerts a force on said cutting tip that acts to push back the latter, resilient means for pressing said pin upper end against the wall of said depression, said resilient means comprising a spring tongue that supports the lower end of said pin.

4. The cutting tool as defined in claim 3, wherein said toolholder comprises a face located below said seat, a slot in said toolholder, said slot extending at least approximately parallel to said seat and being located sufficiently near to said toolholder lower face so as to form out of said toolholder, between said slot and lower face, said spring tongue.

References Cited

UNITED STATES PATENTS

| | | | |
|---|---|---|---|
| 3,045,322 | 7/1962 | Hertel | 29—96 |
| 3,137,059 | 6/1964 | Hertel | 29—96 |
| 3,238,600 | 3/1966 | Milewski | 29—96 |
| 3,256,043 | 6/1966 | Krekeler | 29—96X |
| 3,268,977 | 8/1966 | Diemond | 29—96 |
| 3,303,553 | 2/1967 | Severson | 29—96 |
| 3,309,758 | 3/1967 | Williams | 29—105 |
| 3,310,859 | 3/1967 | Diemond et al. | 29—96 |

FOREIGN PATENTS

| | | | |
|---|---|---|---|
| 216,302 | 12/1960 | Austria | 29—96 |

HARRISON L. HINSON, Primary Examiner